Figure 1:
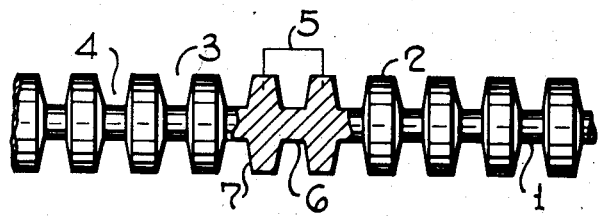

July 7, 1953  H. O. MOTTERN ET AL  2,644,800

SHAPED CATALYST FOR PACKED CATALYTIC REACTOR

Filed June 1, 1949

Henry O. Mottern
Wesley N. Philo   Inventors

By Henry Berk  Attorney

Patented July 7, 1953

2,644,800

UNITED STATES PATENT OFFICE 2,644,800

SHAPED CATALYST FOR PACKED CATALYTIC REACTOR

Henry O. Mottern, Bloomfield, and Wesley N. Philo, Cranford, N. J., assignors to Standard Oil Development Company, a corporation of Delaware Application June 1, 1949, Serial No. 96,486

6 Claims. (Cl. 252—463)

This invention is concerned with a novel metallic catalyst carrier, and particularly with a novel metallic catalyst support consisting of a central metallic element which has been grooved at spaced intervals around the periphery thereof.

Numerous chemical reactions are carried out in the presence of catalysts which require deposition on catalyst supports. For example, the dehydrogenation of secondary alcohol to ketones is commonly accomplished by passing the alcohol vapors (at elevated temperatures) over a catalytic oxide supported on a carrier. The catalytic oxides employed are mixtures of zinc oxide, bismuth oxide, zirconium oxide, copper oxide, chromium oxide, antimony oxide, etc. containing various small proportions of other oxides as promoters, stabilizers, etc. Temperatures of 400° F. to 1000° F. are effective for the dehydrogenation. The catalytic oxides can be used with a higher degree of efficiency when supported on a carrier than when used alone. Catalyst carriers commonly used are generally metallic machine turnings such as steel or brass turnings, pumice, the aluminas, porcelains, etc., of a size insuring good distribution of catalytic oxide throughout the reaction chamber. The metallic machine turnings have been widely used commercially as a convenient easily replaceable catalyst support. The metallic support of this invention represents an improvement over the machine turnings.

The metallic support of this invention consists of a central post element containing a plurality of flanged portions, serrations or fins disposed about the periphery thereof. These flanged portions are preferably uniformly spaced about the central element. They may be formed integrally with the central element or they may be formed separately, and individually applied to the central element. In its simplest form the metallic carrier consists of a straght, preferably cylindrical member, grooved parallel about its circumference said resulting grooves being uniformly-spaced in relation to each other. In another modification the central post element is bent substantially into a circular, helical, rectangular, octagonal or other shape. In such form the individual flanges or serrations approach contact internally of the circle or other area formed by the bent central post element while on the exterior the flanges diverge outwardly.

The central metallic post member may be of any shape although it is preferably cylindrical. Similarly the flange members are preferably cylindrical so that the entire body in its simplest and preferable form consists of a series of annular grooves in a rod-like member forming a plurality of regularly spaced flanges around the periphery thereof. The grooves may be cut to any desired depth of the central post element, preferably from ⅓ to ⅔ of the diameter of the cylindrical element. The cylindrical element should be as small in diameter as is practicable to insure the necessary physical strength required of the metallic support. This diameter will vary with the metallic materal being used for the support.

The flanges, fins, serrations, etc. act as confining elements to hold comparatively large quantities of catalyst, the resulting grooves acting as sprockets for the catalyst.

A typical metallic catalyst support consists of a cylindrical metallic rod which has been circumferentially grooved at spaced intervals with the serrations cut to a depth of about ⅔ of the original diameter of the rod. The rod may be of any diameter adaptable to the specific use to which the carrier is to be put. A carrier possessing a decreased diameter of ⅛" to ¾" has been found to be suitable as a carrier for an oxide catalyst employed in the catalytic dehydrogenation of alcohols to ketones.

After the grooves have been cut in the central rod member the rod may be cut to any desired length or coiled into helical rings. It is preferable to have rods of $\frac{3}{16}$" outer diameter cut into lengths of about 3" which are suitable for bending into a 1" helical ring. These rings have been found to form a packing material more suitable than any other form of the serrated rod.

The serrated rod helix of $\frac{3}{16}$" outer diameter with $\frac{1}{16}$" depth grooves will hold twice as much catalyst coating per unit weight of metal than the ordinary machine turning made by a heavy cut. The overall life of a catalyst is closely related to the weight of the catalyst. By being able to double the weight of the catalyst per weight of metal carrier, excellent catalyst distribution can be maintained without excessively increasing the cost of a single charge and a longer catalyst life results.

The metallic carrier of this invention may be manufactured by simple standard machining operations such as by cutting in a lathe with a multiple-edged tool, by rolling methods, etc.

Figure 2:
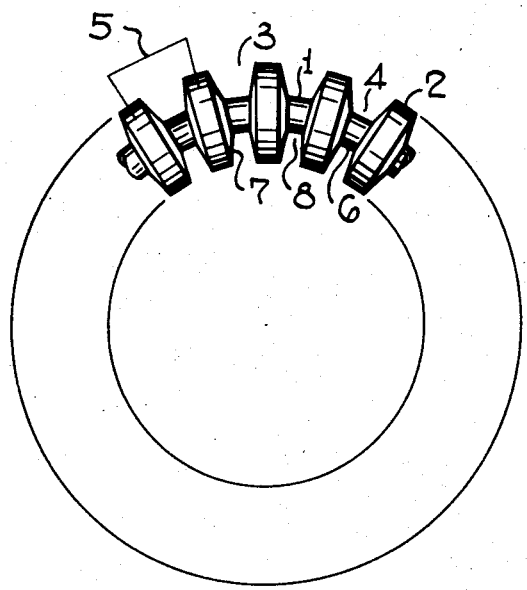

The catalyst carriers are shown for purposes of illustration in the accompanying drawing. Figure 1 of the drawing is a partial sectional elevational view of the carrier in its simplest form. Figure 2 is a side elevational view of a modified and a preferable form of the carrier when used in a chemical reaction where packing of the element is required to prevent channeling, etc.

Referring to Figure 1 numeral 1 represents a straight central post element illustrated in this instance as a cylindrical rod. Numeral 2 represents a flange, serration or fin which is situated substantially uniformly about the central post element. The distances 3 between the serrations spaced about the central post element may vary but is prefarably uniform resulting in a constant pitch 5 to the entire structure. Grooves 4 are formed between two adjacent serrations. The root of the groove 6 is the outermost surface of the central post element. The sides of the grooves 7 may be straight or pitched, however, the angle formed by the root and the sides should not be too great else the catalyst will not be supported satisfactorily between any two adjacent grooves.

Figure 2 illustrates a partial section of the element of Figure 1 when it is bent into a helical ring. In this form the outer grooves 4 due to the divergence of their sides are larger than the inner grooves 8 whose sides become closer to each other due to the bending of the central post element.

The carrier may be made of any workable metal or metallic alloys, for example, iron, zinc, copper, brass, aluminum, magnesium, etc. The metal employed should be stable toward the catalyst to be deposited thereon; or, on the other hand, so inexpensive that it can be discarded when spent. Aluminum coated with solid phosphoric acid is cited as an example of a catalyst of the latter class.

The catalyst is supplied to the carrier by forming a slurry of the solid catalyst with water or other solvent until a paste-like consistency is obtained. The carrier is mixed with the catalyst and the catalyst deposited thereon by known methods such as by tumbling in a mill. During the tumbling the catalyst becomes deposited upon the carrier filling up the grooves 4 and entirely coating the central post member and the serrations thereof so that the exterior surface of the catalyst after drying is comparatively smooth. Any solid catalyst may be employed which requires deposition or which must be applied as a coating, for example, the various metallic oxides such as those referred to above, metallic sulfides, solid phosphoric acid, the clay-type catalyst, bauxite, or mixtures thereof, etc. This invention is not limited to any particular type of solid catalyst which may be deposited on the metallic carrier. However, care should be exercised in choosing as the carrier metal, a metal which will be stable toward the catalyst and the reactants, or one which is inexpensive and economically disposable when spent.

The carrier of this invention may be employed in any chemical reaction requiring the use of a solid catalyst, for example, dehydrogenation, hydrogenation, polymerization, hydration and numerous other reactions where a solid catalyst is required. In carrying out the chemical reaction the catalytic material, that is, the carrier with the catalyst coated thereon, is packed into a reaction vessel or into tubes contained within a reaction vessel such as is well known in the chemical arts. The reactants in liquid or vapor form are allowed to pass over or through the stationary bed of said catalyst or carrier.

The catalyst support described permits control over the amount and distribution of catalyst surface throughout the catalyst bed. Machine turnings vary in size and weight and in the amount of catalyst each turning may carry. Therefore the catalyst density throughout the bed may vary widely. With the metallic support of this invention uniform catalyst weight and therefore uniform catalyst density may be obtained. Non-uniform densities permit changing vapor velocity throughout a catalyst bed which is particularly undesirable, for example, in the vapor phase dehydrogenation of alcohols to ketones or aldehydes and other chemical reactions. The metallic carriers are particularly adaptable to re-use. When a catalyst deposited on machine turnings becomes spent and is ready for regeneration, it is necessary to wash off the spent catalyst from the turnings. In this washing operation considerable loss of turnings is experienced due to their breaking and conversion to powder-like metal which must be discarded. The carrier of this invention is much more sturdy and can be re-used for an indefinite number of catalyst coatings.

Numerous modifications of the metallic carrier described will be suggested to those skilled in the art from the description offered, without departing from the spirit of this invention.

What is claimed is:

1. A shaped catalyst material, adapted for employment as packing in a packed catalytic reactor, comprising a metal support element up to about 3 inches in length having an elongated generally cylindrical body portion having an outside diameter of 1/8 to 3/4 inches and a plurality of annular flanges concentric with said body portion and disposed in spaced relation one to another longitudinally of said body portion forming a plurality of spaced annular pockets between said flanges in which said flanges have a width substantially equal from about 1/3 to 2/3 the diameter of said support element, and a solid catalyst material deposited on said element completely filling said annular pockets and forming on said element a catalyst surface coating.

2. A material according to claim 1 in which said body portion is preformed as an annular ring member not larger than 1 inch in diameter, the annular pockets therein being annularly related to the inner circumference thereof.

3. A material according to claim 2 in which the annular ring member is a helix approximately one inch in diameter.

4. A material according to claim 1 in which the solid catalyst material comprises at least one metal oxide and in which the metal support element is brass.

5. A material according to claim 1 in which the solid catalyst material comprises at least one metal oxide and in which the metal support element is steel.

6. A material according to claim 1 in which the solid catalyst material comprises at least one metal oxide and in which the metal support element is aluminum.

HENRY O. MOTTERN.
WESLEY N. PHILO.

References Cited in the file of this patent

UNITED STATES PATENTS

| Number | Name | Date |
| --- | --- | --- |
| 1,124,333 | Sabater et al. | Jan. 12, 1915 |
| 1,642,624 | Northrup | Sept. 13, 1927 |
| 1,953,120 | Miller | Apr. 3, 1934 |
| 2,128,457 | Fairchild | Aug. 30, 1938 |
| 2,387,026 | Huntington | Oct. 16, 1945 |
| 2,408,164 | Foster | Sept. 24, 1946 |
| 2,425,969 | Utterback | Aug. 19, 1947 |

FOREIGN PATENTS

| Number | Country | Date |
| --- | --- | --- |
| 862,926 | France | Mar. 19, 1941 |